US011268799B2

(12) United States Patent
Dall'Aglio

(10) Patent No.: US 11,268,799 B2
(45) Date of Patent: Mar. 8, 2022

(54) APPARATUS AND METHOD FOR CHECKING DIAMETRAL DIMENSIONS OF AN ORBITALLY ROTATING PIN

(71) Applicant: Marposs Societa' Per Azioni, Bentivoglio (IT)

(72) Inventor: Carlo Dall'Aglio, Castello D'Argile (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 231 days.

(21) Appl. No.: 16/635,066

(22) PCT Filed: Aug. 1, 2018

(86) PCT No.: PCT/EP2018/070839
§ 371 (c)(1),
(2) Date: Jan. 29, 2020

(87) PCT Pub. No.: WO2019/025480
PCT Pub. Date: Feb. 7, 2019

(65) Prior Publication Data
US 2020/0249006 A1    Aug. 6, 2020

(30) Foreign Application Priority Data

Aug. 2, 2017  (IT) .......................... 102017000088988

(51) Int. Cl.
*G01B 5/10*        (2006.01)
*G01B 3/22*        (2006.01)
(Continued)

(52) U.S. Cl.
CPC .................. *G01B 5/10* (2013.01); *B24B 5/42* (2013.01); *B24B 49/045* (2013.01); *G01B 3/22* (2013.01)

(58) Field of Classification Search
CPC ......... G01B 5/065; G01B 11/272; G01S 7/40; G01S 13/931; G01S 7/4082;
(Continued)

(56) References Cited

U.S. PATENT DOCUMENTS 4,528,876 A  *  7/1985  Logue ...................... B23B 5/18
                                                451/399
5,086,569 A  *  2/1992  Possati ..................... G01B 7/12
                                                33/549
(Continued)

FOREIGN PATENT DOCUMENTS

EP        1 118 833 A2    7/2001
WO        WO 97/12724 A1  4/1997

*Primary Examiner* — Yaritza Guadalupe-McCall
(74) *Attorney, Agent, or Firm* — Blank Rome LLP

(57) ABSTRACT

An apparatus for checking the diameter of crankpins (15) of a crankshaft in orbital motion about a geometrical axis in a numerical control machine tool includes a V-shaped reference device (10), a measuring device (6) and a support device (4) fixed to the tool holding slide (2) that movably supports the reference device and the measuring device. A control device (50) for controlling automatic displacements of the apparatus towards and away from a checking condition, includes a programmable electric motor (60) and a transmission mechanism (62). The programmable electric motor is programmed to define a start position in which the automatic displacement of the apparatus away from the checking condition can be stopped, for instance a rest position or an intermediate position between the rest position and the checking condition. The programmable electric motor is also programmed to define a displacement speed and a checking method includes steps for controlling the automatic displacements towards the checking condition.

19 Claims, 6 Drawing Sheets

(51) Int. Cl.
*B24B 5/42* (2006.01)
*B24B 49/04* (2006.01)

(58) Field of Classification Search
CPC .... G01S 7/4026; F16M 11/041; F16M 11/18; F16M 11/046; F16M 2200/027; F16M 2200/08; F16M 11/04; F16M 11/24
See application file for complete search history.

(56) References Cited

U.S. PATENT DOCUMENTS

| | | | |
|---|---|---|---|
| 6,546,642 B1* | 4/2003 | Dall'Aglio | B24B 49/04 33/551 |
| 6,920,698 B2* | 7/2005 | Dall'Aglio | B24B 49/04 33/551 |
| 7,076,882 B2* | 7/2006 | Dall'Aglio | B24B 49/04 33/551 |
| 7,266,900 B2* | 9/2007 | Dall'Aglio | B24B 49/04 33/551 |
| 8,336,224 B2* | 12/2012 | Arnold | B24B 49/04 33/555.1 |
| 9,878,418 B2* | 1/2018 | Dall'Aglio | B24B 49/045 |
| 9,879,969 B2* | 1/2018 | Volk | G01B 5/08 |
| 2011/0119943 A1 | 5/2011 | Arnold | |
| 2015/0233693 A1 | 8/2015 | Senn et al. | |
| 2016/0221142 A1 | 8/2016 | Dall'Aglio | |
| 2017/0082417 A1* | 3/2017 | Volk | B23Q 17/20 |
| 2020/0249006 A1* | 8/2020 | Dall'Aglio | B24B 49/045 |

\* cited by examiner

APPARATUS AND METHOD FOR CHECKING DIAMETRAL DIMENSIONS OF AN ORBITALLY ROTATING PIN

TECHNICAL FIELD

The invention relates to an apparatus for checking diametral dimensions of a pin, in orbital motion about a geometrical axis in a numerical control machine tool having a tool holding slide, with a reference device adapted to cooperate with the pin to be checked, a measuring device, movable with the reference device, a support device adapted to be fixed to the tool holding slide for movably supporting the reference device and the measuring device, to allow the reference device to move so as to follow the pin to be checked in its orbital motion, and a control device for controlling automatic displacements of the apparatus towards the checking condition and away from the checking condition.

The invention relates also to a method for checking diametral dimensions of a pin in orbital motion about a geometrical axis at a known rotational speed.

BACKGROUND ART

Apparatuses having said features, for example for checking, in a crankshaft, the diametral dimensions of crankpins rotating with orbital motion about a geometrical axis in the course of the machining in a grinding machine, e.g. a milling or a grinding machine, are shown in the international patent application published under No. WO-A-9712724, filed by the same applicant of the present patent application.

In particular, according to the embodiments shown and described in the cited international patent application, the apparatuses have Vee-shaped reference devices that rest on the crankpin to be checked and maintain the correct cooperation with the surface of the crankpin substantially due to the gravity, and guide means associated with said Vee-shaped reference devices, with elements having suitable surfaces intended to enter into engagement with the same crankpin during the displacement from a withdrawn position to an operating position.

The solutions according to the international patent application WO-A-9712724 guarantee, from a metrological point of view, excellent results with small inertial forces, and the performance of the apparatuses with the equivalent features, manufactured by the applicant of the present patent application, confirms the validity and reliability of said solutions.

Similar apparatuses, which employ different or additional guide means, are shown for example in the European patent application published under No. EP-A-1118833 also filed by the same applicant of the present patent application.

Also these solutions guarantee excellent performances. In the above-mentioned solutions, displacements from a rest position to the control condition and vice versa are controlled by control devices with a hydraulic or pneumatic driving unit typically comprising a double-acting hydraulic cylinder. These well-known driving units have limited flexibility of use, in particular as far as the speed of the controlled displacements and the definition of the rest position or of other start/stop/standing positions of the reference device during such displacements are concerned, and do not substantially allow any adjustment when checking orbiting parts which differ, for example, in the rotation speed, in the distance from the rotation axis or in other geometrical characteristics.

DESCRIPTION OF THE INVENTION

Object of the present invention is to provide an apparatus for dimensional and/or shape checking of cylindrical parts in orbital motion in a machine tool, for example for in-process checking in a grinding machine for crankpins, which guarantees at least the same performance as the apparatuses according to the aforementioned patent applications in terms of accuracy and repeatability and allows to improve the aspects related to the flexibility of use, in particular as regards the optimization of the cycle times on the basis of the characteristics of the specific application.

This problem is resolved by a checking apparatus according to claim 1.

In an apparatus according to the present invention, the control device comprises a programmable electric motor and a transmission mechanism. By means of the programmable electric motor, which can be a stepper or a different type of motor, the displacement speed of the apparatus, more specifically of the reference device (and of the measuring device moving together with the reference device) can be selected in a flexible way according to the specific need and in order to optimize the cycle time on the basis of the specific application. For instance, the speeds of the displacements towards and away from the checking condition can be individually set on the basis of the orbital rotation speed of the pin to be checked, taking also into account the geometrical characteristics of such a pin. In such a way it is possible to synchronize the displacement of the reference and measuring devices with the pin rotation and choose the appropriate displacement speed that, for example, allows the reference device to engage the pin at the most favorable moment, typically when the pin moves away from the reference device substantially with the maximum speed, thus minimizing the mechanical impact between reference device and pin. The transmission mechanism between the programmable electric motor and the support device has features such as not to interfere mechanically when the reference device, typically a V-shaped reference device, is resting on the pin, following the latter in its orbital motion, and maintaining the correct contact substantially by effect of gravity.

The programmable electric motor, in addition to guaranteeing an increased repeatability of the movements, allows to define in a flexible and advantageous way the rest position of the apparatus as well as possible intermediate positions, at least one intermediate position, for example so as to minimize the movements needed when passing from a pin to be checked to another one, the pins being for instance crankpins of a same crankshaft. Such rest/intermediate positions can for example be automatically acquired in a calibration phase, or set in different ways.

Additionally, the electromechanical solution according to the present invention is more simple and less expensive with respect to the known solutions employing a hydraulic driving unit and relative circuits, and does not need the complex and costly management procedures required by such device, for instance to comply with the rules for the protection of the environment. In particular, the invention allows both to decrease the direct costs for fitting out the machine and to significantly reduce oil disposal costs, guaranteeing eco-sustainability features much better than those made available by the known technology. Another advantage provided by the electromechanical driving solution according to the present invention is the smoothness of the movements that, contrary to what happens when pneumatic or hydraulic driving means are employed, is not influenced by factors such as the viscosity of the fluids, the length of the ducts and the operating temperature.

BRIEF DESCRIPTION OF THE DRAWINGS

The invention is now described in detail with reference to a preferred embodiment illustrated in the annexed drawings, to be understood as exemplary and non-limiting, wherein.

BEST MODE FOR CARRYING OUT THE INVENTION

Figure 1:
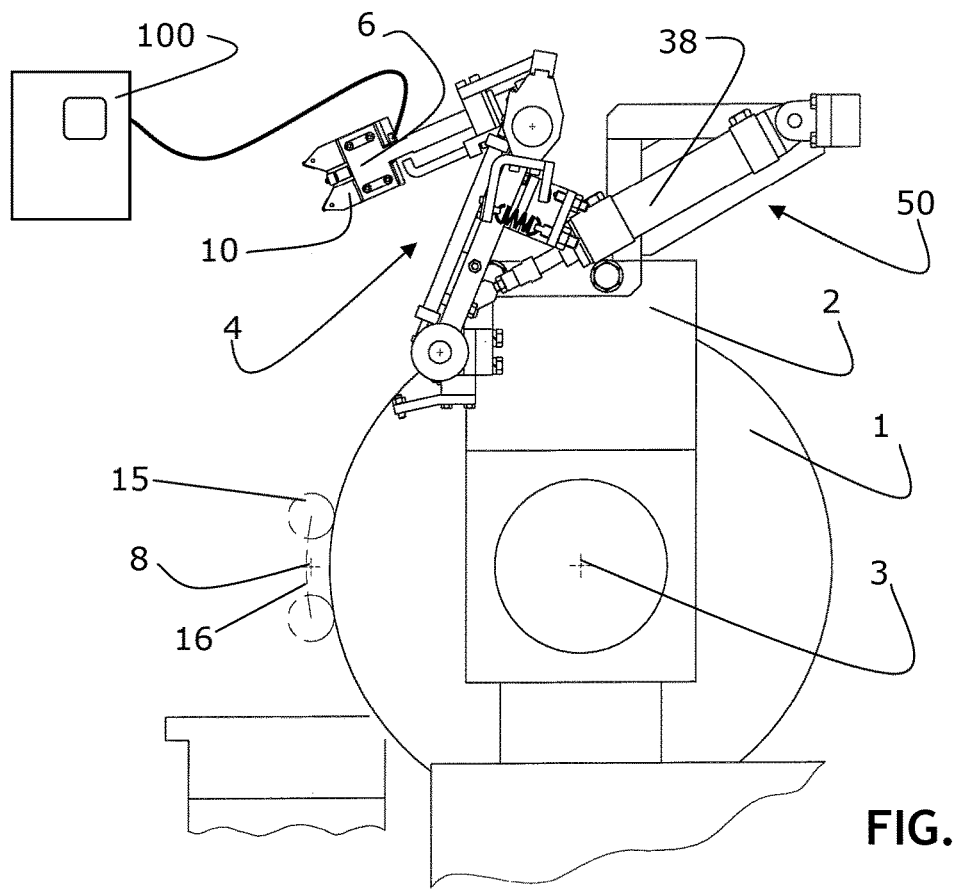
FIG. 1 is a side view of a known checking apparatus mounted on the grinding-wheel slide of a grinding machine for crankshafts.
Figure 2:
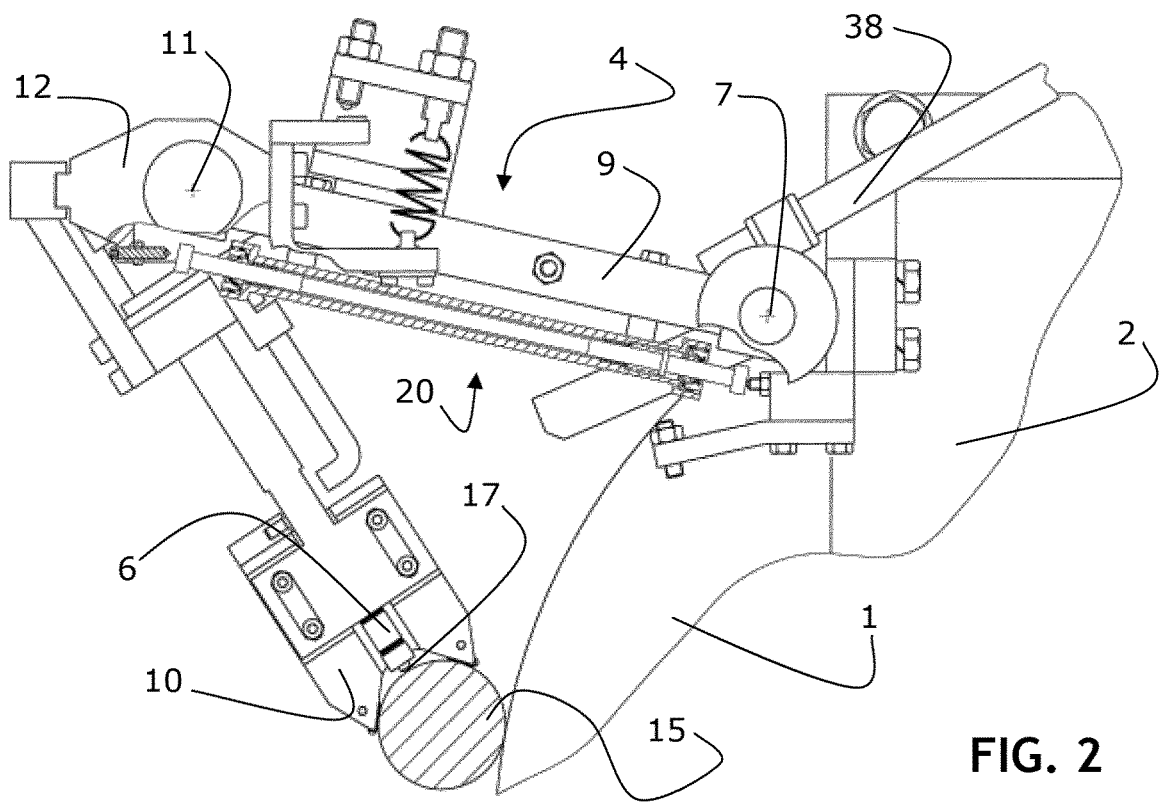
FIG. 2 is an enlarged view of a detail of the known checking apparatus of FIG. 1, where some parts are cross sectioned.

FIGS. 1 and 2 show an apparatus of a known type, for the dimensional checking of a crankshaft, in particular for the checking of diametral dimensions of a pin, or crankpin 15 that moves with orbital motion on a machine tool such as a computer numerical control ("CNC") grinding machine comprising a tool, that is a grinding wheel 1 carried by a tool holding slide 2, more specifically a grinding wheel slide and rotating around a geometrical axis 3. The apparatus can carry out the check during the processing of the crankshaft, and/or before and/or after such processing. A worktable comprises a spindle and a dead center, not shown in the figure, which define a geometrical axis 8 of rotation. A crankshaft to be machined is mounted on the machine tool with the main axis aligned with the geometrical axis 8. As a consequence, each crankpin 15 of the crankshaft runs through an orbital motion around the axis 8. Although the crankpin 15 eccentrically rotates about the axis 8, following a circular trajectory, the trajectory of the pin with respect to the tool holding slide 2 can be substantially represented by the arc drafted by a dotted line and indicated by the reference 16.

The known apparatus of FIGS. 1 and 2 comprises a reference device 10, in particular a V-shaped device, with rest and reference surfaces intended to engage with the surface of the pin 15, and a measuring device 6, known per se, connected to and movable with the reference device 10, for example similar to that shown in the previously cited patent application published with the number EP-A-1118833, which detects radial displacements of a feeler 17 and is electrically connected to a processing and display unit 100 the latter being in turn connected (in a manner known per se and not shown in the figures) to the numerical control of the grinding machine. The feeler 17 is connected to the reference device 10 so as to touch the surface of the pin 15 to be checked and to move along a measurement direction that coincides with the bisector of the V-shaped reference device 10, or is slightly angled with respect to it, and goes through the V-shaped reference device 10 between the relative rest and reference surfaces. A support device 4 is fixed to the tool holding slide 2 and supports the V-shaped reference device 10 and the measuring device 6 in a movable manner, that is in order to allow movements of the V-shaped reference device 10 and of the measuring device 6 to follow the pin 15 to be checked in its orbital motion. The support device 4 comprises, as shown in the partial view of FIG. 2, a first coupling element 9, rotating by means of a pivot defining a first rotation axis 7 parallel to the rotation geometrical axis 3 of the grinding wheel 1 and to the rotation geometrical axis 8 of the crankshaft to be checked. In turn, a second coupling element 12 which carries the reference device 10 is rotatably coupled to the coupling element 9 by means of a second pivot defining a second rotation axis 11 parallel to the axes 3 and 8. Since, as said above, the crankpin 15 to be checked while machined moves along the arc 16 with respect to the tool holding slide 2, the reference device 10 travels along a similar trajectory when it rests on the pin 15, with alternate motion from top to bottom and vice versa and with frequency - with some or several tens of revolutions per minute—equal to that of the orbital motion of the crankpin 15. This comes from the fact that the checking apparatus according to this invention is carried by the tool holding slide 2 which, in the current numerical control grinders, performs the machining of the crankpins 15 while the latter orbitally move, "tracking" the crankpins 15 so as to maintain the tool, in particular the grinding wheel 1, in contact with the machined surface. Obviously, a forward closing motion due to the removal of stock is added to the transverse "tracking" motion.

A guiding mechanism is associated to the support device 4 for guiding the arrangement of the V-shaped reference device 10 onto the pin 15, that is towards a checking condition of the apparatus, and comprises a limiting device 20 between the tool holding slide 2 and the second coupling element 12. The guiding mechanism, described for instance in the previously cited patent application published with the number EP-A-1118833, constrains the mutual movements of the components of the support device 4 so that, while passing from a rest position to the checking condition of the apparatus, the V-shaped reference device 10 is constrained to follow, under the effect of gravity, a trajectory that is parallel to the profile of the grinding wheel 1 and very close to the grinding wheel 1, typically at a distance of few millimeters from it.

A control device 50 for controlling automatic displacements of the apparatus from the rest position towards the checking condition, and vice versa, that is away from the checking condition, comprises a driving mechanism with a double-acting cylinder 38, for example of a hydraulic type, to rotate counterclockwise or clockwise the support device 4 about the first axis 7 acting for instance on the first coupling element 9. By effect of mechanical stops and of the force of gravity acting on the components of the apparatus, the counterclockwise rotations of the first coupling element 9 cause the lowering of the V-shaped reference device 10 towards the pin 15 to be checked, guided by the guiding mechanism, while the clockwise rotations of the first coupling element 9 cause the raising of the V-shaped reference device 10, away from the pin 15 to be checked, towards a rest position.

An additional compensation device, not shown, may be provided to allow the adjustment of the position of the support device 4 on the grinding wheel slide 2 to compensate positional changes of the pin 15 to be checked due to the wear of the grinding wheel 1.

Figure 3:
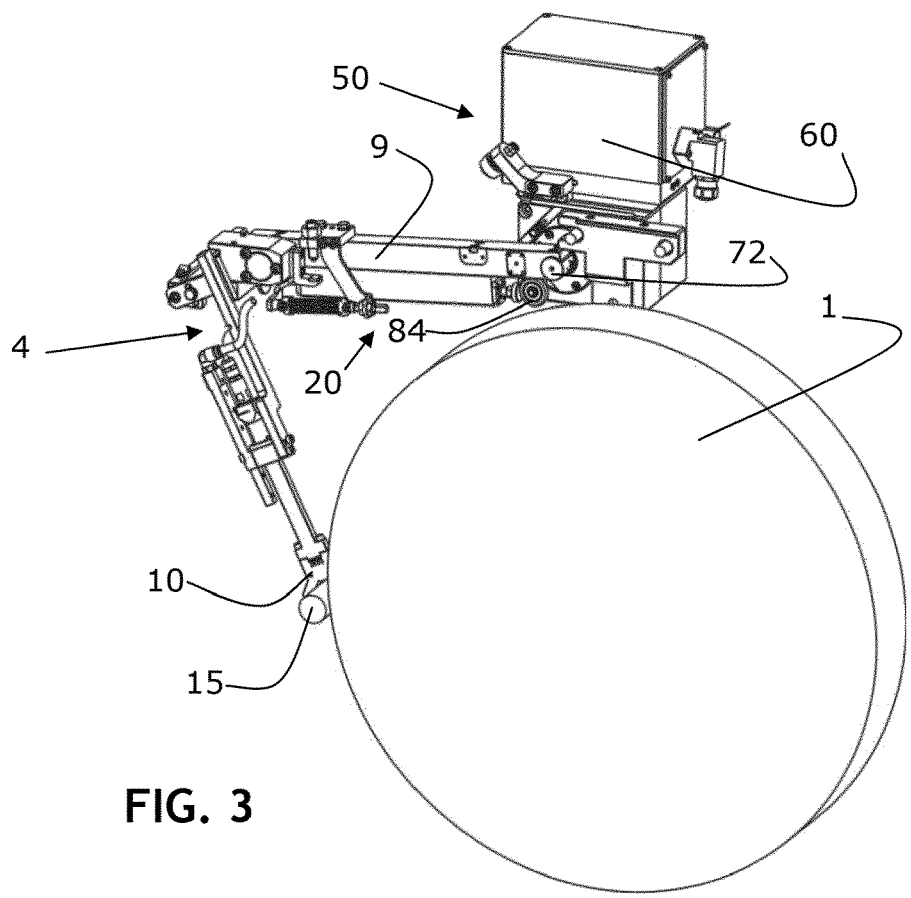
FIG. 3 is a perspective view of a checking apparatus according to the present invention.
Figure 4:
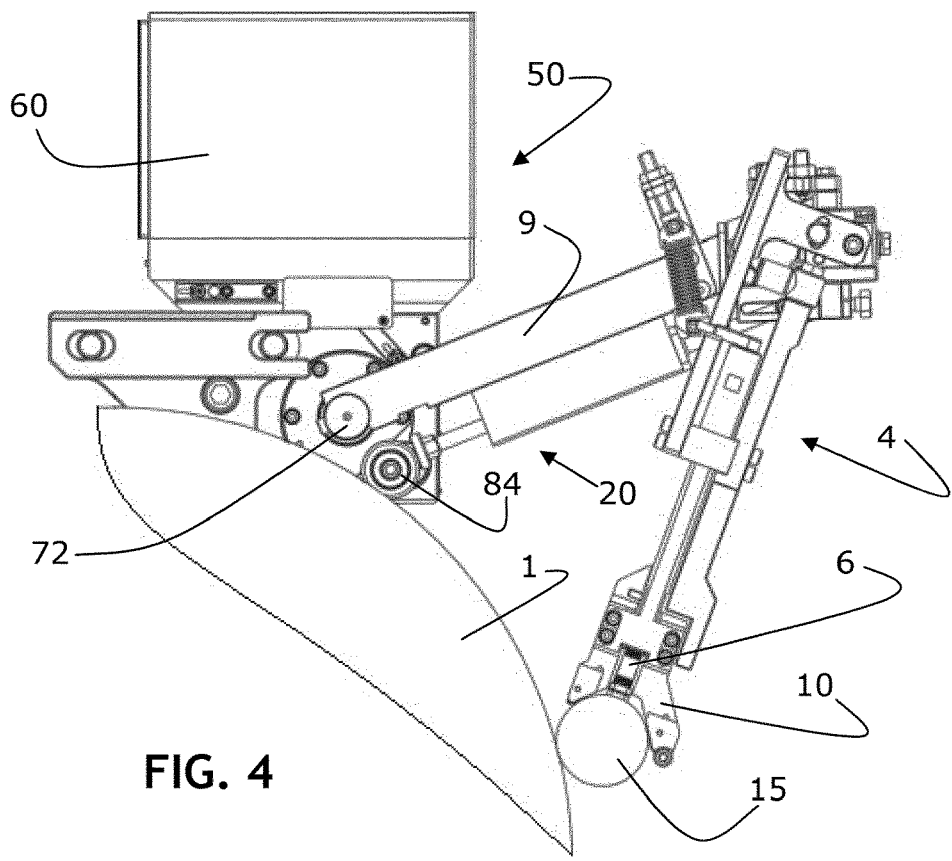
FIG. 4 is a side view of the checking apparatus of FIG. 3.
Figure 6:
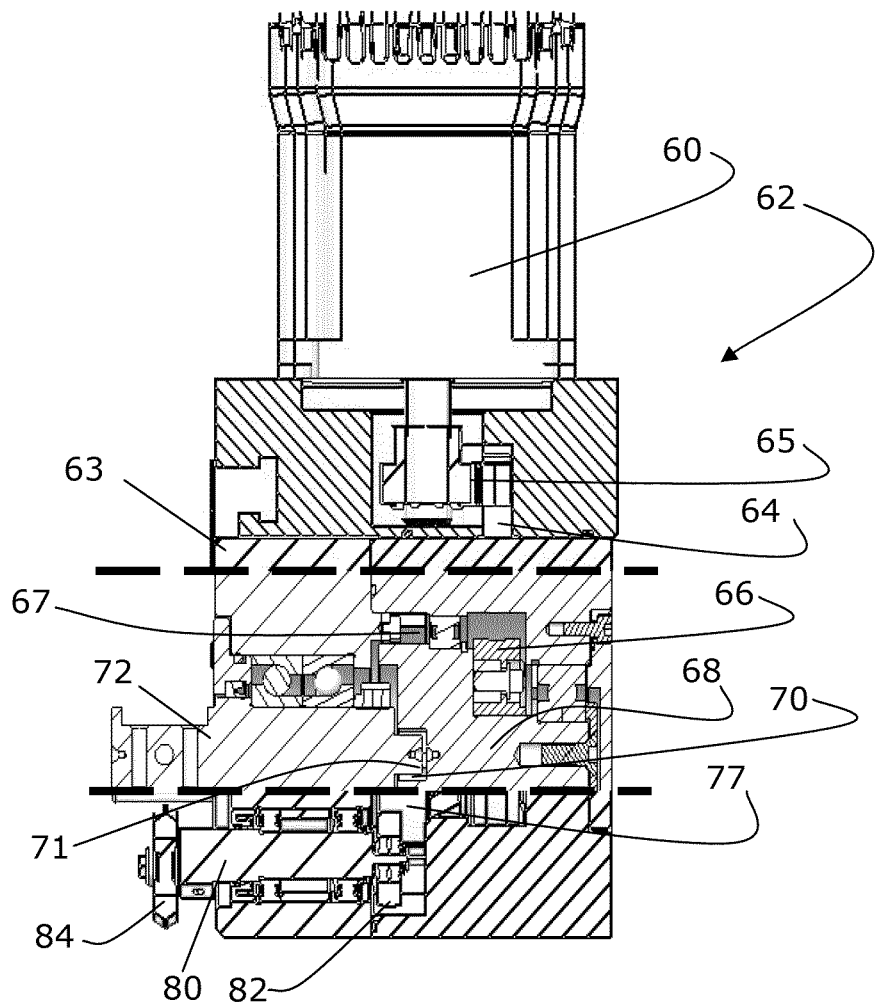
FIG. 6 is a longitudinal section, along three different sectional planes, of a control device of an apparatus according to the present invention.
Figure 7:
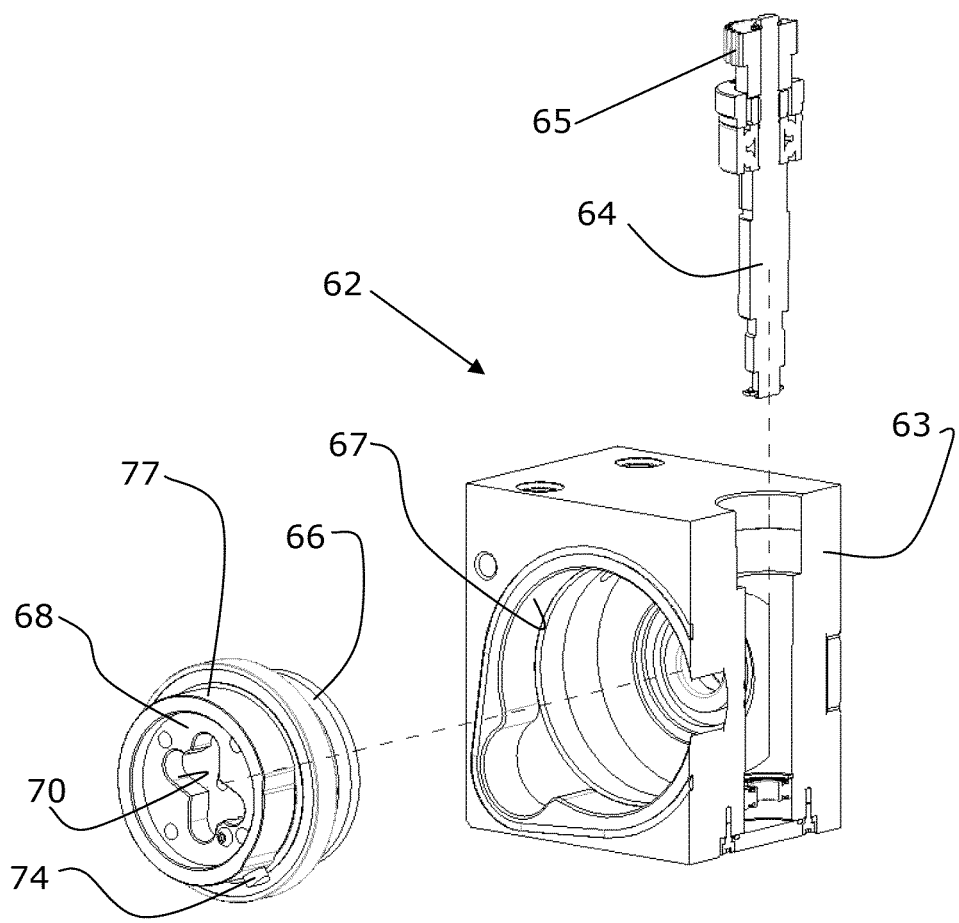
FIG. 7 is an exploded view of some components of the control device of FIG. 6.
Figure 8:
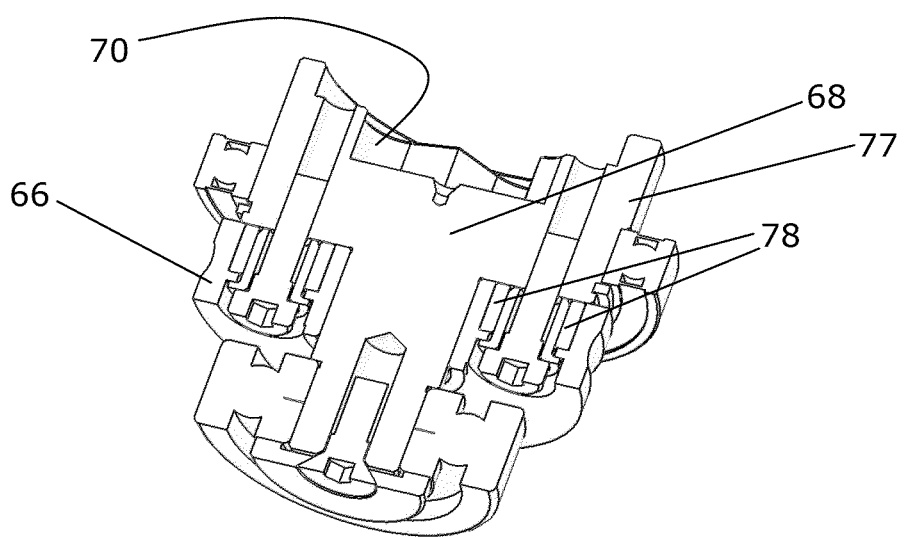
FIG. 8 is an enlarged and differently oriented perspective section of some components of the control device of FIG. 6.

FIG. 3 and FIG. 4 show apparatuses according to the present invention, which comprise many of the features of the known apparatuses of FIGS. 1 and 2, and are likewise intended to be fixed to a tool holding slide, for example in a grinding machine. The control device 50 of the apparatuses of FIGS. 3 and 4 has different features with respect to the above described control device and includes a programmable electric motor 60, preferably but not necessarily a stepping motor, and a transmission mechanism 62 between the motor 60 and the support device 4. The transmission mechanism is shown for example in FIG. 6, where cross sections along three different sectional planes are separated by two bold dashed lines.

Figure 5:
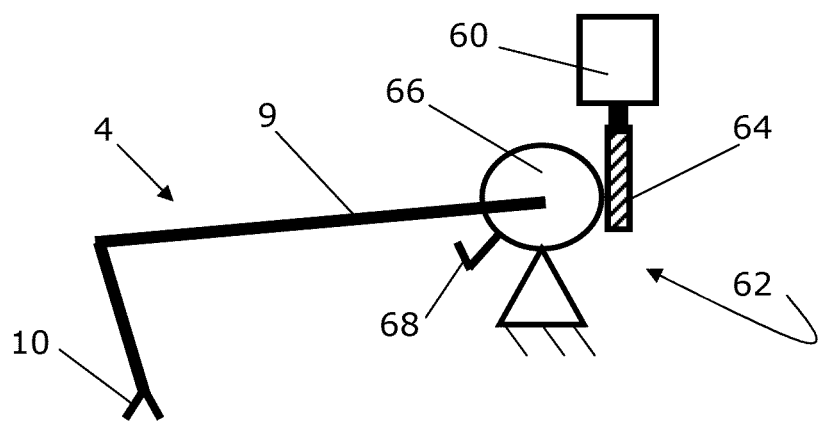
FIG. 5 shows, in an extremely simplified way, some features of an apparatus according to the present invention.

FIG. 5 very schematically illustrates some components of a possible transmission mechanism 62, which in particular comprises a worm 64 and a helical gear wheel 66 coupled to the worm 64. A driver 68 is coupled to the programmable electric motor 60 through the worm 64 and the helical gear wheel 66 and cooperates with a component of the support device, in particular with the coupling element 9. FIGS. 6, 7, 8 and 9a-9d show details of the particular transmission mechanism which represents only an exemplary embodiment. In particular, the transmission mechanism 62 comprises a transmission body 63 coupled to the programmable electric motor 60 and housing in proper seats said worm 64, helical gear wheel 66 and driver 68. The driver 68 is formed by an element having substantially rotational symmetry which rotates coaxially with the helical gear wheel 66 and comprises a butterfly-shaped seat 70, also visible in FIGS. 7 and 9, which houses a flat end portion 71 of a rotation shaft 72—connected to the coupling element 9—as shown in FIGS. 9a-9d which represent the sequence of movements and how some internal components cooperate with one another. The driver 68 and a component of the support device, in particular the coupling element 9, are mutually connected by a coupling with clearance between the flat end portion 71 of the rotation shaft 72 and the butterfly-shaped seat 70.

The driver 68 is connected to the helical gear wheel 66 which is coupled to the worm 64 which is driven by the motor 60, for example by means of a further pair of gears 65. The driver 68 has a portion 77 having substantially cylindrical outer surface with a part 76 which is also cylindrical but with a smaller diameter. A seat 67 of the transmission body 63 housing the portion 77 of the driver 68 is also substantially cylindrical, and includes a part 69 with larger radial dimensions. The driver 68 defines a through, substantially radial hole 73 in communication with the butterfly shaped seat 70 that houses a bolt 74 and a spring 75 outwardly pushing the bolt 74. As said, the rotation shaft 72 is connected to the coupling element 9 of the support device 4.

A "grinding wheel wear recovery" mechanism, or grinding wheel wear compensation mechanism, includes a shaft 80 (FIG. 6) which supports at the two ends two rollers eccentrically arranged with respect to a rotation axis of the shaft 80, or shaft axis 83: an inner roller 82 that is in contact with the cylindrical surface of the portion 77 of the driver 68 and an outer roller 84 (also visible in FIGS. 3 and 4) that acts on the support device 4, more specifically it cooperates with the limiting device 20.

Figure 9D:
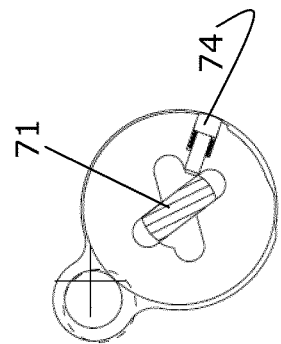
FIGS. 9a to 9d are schematic and partial cross-sections of some components of the control device of FIG. 6 in different operating positions.
Figure 9C:
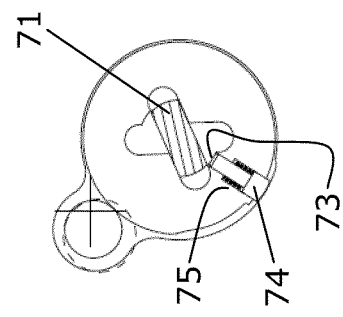
Figure 9B:
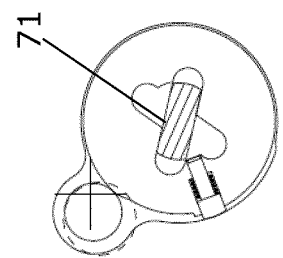
Figure 9A:
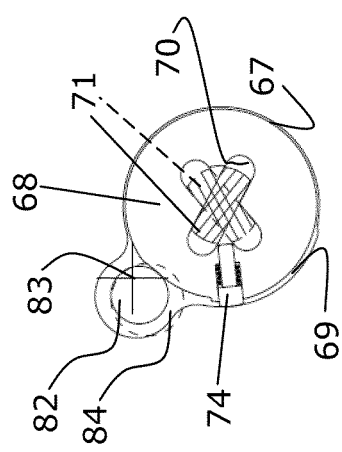

In FIG. 9a, the mechanism is shown in the measurement position, i.e. in a checking condition: the V-shaped reference device 10 is resting on the pin 15 and is free to move because the flat end portion 71 of the rotation shaft 72 can freely rotate in a wide part of the butterfly-shaped seat 70 (FIG. 9a shows the two possible limit positions between which the flat end portion 71 of the rotation shaft 72 can freely rotate). The outer roller 84 is in a retracted position because the inner roller 82 rests on the part 76 of the driver 68 having smaller diameter. The motor 60 is stationary.

In the phase of movement in a retraction direction towards the rest position (FIGS. 9b and 9c), the driver 68 starts to rotate (in a counterclockwise direction, with reference to FIGS. 9a-9d) and begins to drag the shaft 72 and then to lift the coupling element 9. At the same time the outer roller 84 rotates in the same direction around the shaft axis 83 and, due to its eccentricity, in fact advances with respect to the position assumed previously (towards the right, with reference to FIG. 4).

The bolt 74, pushed by the spring 75, up to this point remains in contact with the surface of the part 69 with larger radial dimensions of the seat 67 and does not protrude into the butterfly-shaped seat 70.

From the condition of FIG. 9c to that of FIG. 9d the counterclockwise rotation of the driver 68 which entrains the flat end portion 71 of the rotation shaft 72 continues and at the same time the bolt 74 encounters a variation in the diameter of the surface of the seat 67 housing the driver 68 on which it rests due to the thrust of the spring 75 and it is pushed to protrude inside the butterfly-shaped seat 70, so constraining the relative rotations between shaft 72 and driver 68. This allows locking the position of the first coupling element 9 when the rest position corresponds to an arrangement of the components of the support device 4 which due to the force of gravity, could cause further movements of the apparatus, beyond the rest position, in the retraction direction.

During the phase of transition from the rest position to the checking condition the process is opposite. Moving towards the checking condition, when, in the course of the clockwise (with reference do the view of FIGS. 9a-9d) rotation of the driver 68 the inner roller 82 is put into rotation and causes eccentric rotation of the outer roller 84 so that when the V-shaped device 10 gets close to the pin 15 to be checked, the surface of the outer roller 84 draws back with respect to the limiting device 20 (towards the left making reference to FIG. 4) leaving room for a possible small further rotation of the support device 4 about the first rotation axis 7, such small further rotation allowing to recover any wear of the grinding wheel 1 causing a small displacement of the pin 15 (towards the left making reference to FIG. 4).

In a preferred embodiment of the invention, the helical gear wheel 66 and the driver 68 are not rigidly connected to each other, more specifically four or more rubber pads 78 (FIG. 8) are arranged between them and act as dampers, allowing very small mutual rotations so as to absorb sudden torque variations.

Figure 10:
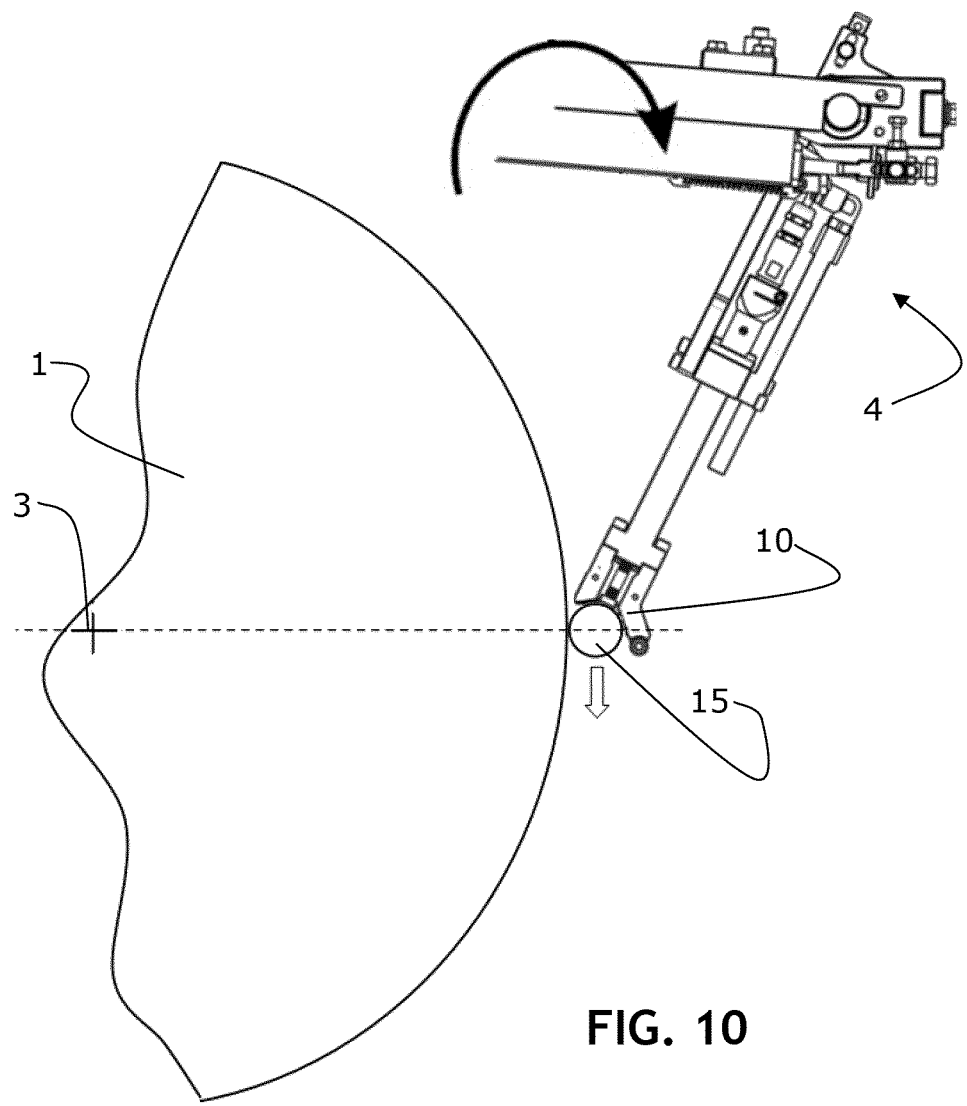
FIG. 10 is a partial side view of a checking apparatus according to the present invention shown in a phase of the operation, while it is engaging an orbitally rotating pin to be checked.

The control device 50 with a programmable electric motor 60 allows to flexibly define and adjust the speed of the above-mentioned automatic displacements, that is a displacement speed with which the V-shaped reference device 10 is moved towards and away from the checking condition. In particular, the speed with which, starting from a certain position, the automatic displacements of the apparatus take place and the V-shaped reference device 10 is brought towards the crankpin 15 while the latter is orbitally moving can be defined, so allowing synchronization of the two movements (i.e. the automatic displacement of the apparatus and the orbital movement of the crankpin 15) so that the contact between the V-shaped reference device 10 and the crankpin 15 occurs gently substantially without any significant bump, preferably when the crankpin 15 is moving away substantially with the maximum speed from the V-shaped reference device 10. This happens when the pin 15 is in a central position, aligned with the rotation geometric axes 3 and 8 of the grinding wheel 1 and of the crankshaft, while it is lowering towards the bottom dead center of its path (FIG. 10). More specifically, a method according to the present invention, for checking diametral dimensions of the pin 15 that is orbitally rotating at a known rotational speed, includes the following steps, not necessarily in this order. A start position of the apparatus, that is a position at which the reference device 10 is spaced apart from the pin 15, is defined, as well as a match position of the pin 15, that is a position at which it is desired that the reference device 10 engages the pin 15. The match position is chosen for instance, according to a preferred embodiment, as the above-mentioned central position, aligned with the rotation geometric axes 3 and 8 of the grinding wheel 1 and of the crankshaft, while the pin 15 is lowering towards the bottom dead center of its path. A travel time is calculated based on the known rotational speed of the pin 15, that is a time that the pin needs, in its orbital motion, to cover a path between a predetermined angular position and the match position. Such path may correspond to an angle that is lower or higher than 360°. The displacement speed of the apparatus is calculated and an approaching time is calculated as the time needed to displace the apparatus, more specifically the reference device 10, from the start position to the match position of the pin 15. The displacement speed is set so that the approaching time is shorter than the travel time, and a delay is calculated based on said travel and approaching times. A transit instant is detected, for instance by means of a proximity switch, per se known and not shown in the drawings, as the instant at which the pin 15, during its orbital motion, is located at the above-mentioned predetermined angular position, and a start instant is calculated based on the above-mentioned transit instant and delay. At the start instant a displacement of the apparatus from the start position to the checking condition at the set displacement speed is controlled. In this way, the V-shaped reference device 10 engages the pin 15 at the match position of the latter as defined above, and the contact between the parts happens without any significant bump that may cause negative bounces and physical damages.

When the V-shaped reference device 10 rests on the crankpin 15, its movement is completely independent of the motor 60. In particular, in the checking condition the correct cooperation between crankpin 15 and the V-shaped reference device 10 is maintained substantially due to gravity, more specifically due to the displacements of the coupling elements 9, 12 caused by the force of gravity and by the thrust of the crankpin 15, the latter opposing to the force of gravity of the components of the checking apparatus.

The possibility of making a correct and flexible synchronization between the movements of the V-shaped reference device 10 and those of the pin 15 in orbital motion allows to raise the limit of the maximum rotation speed at which the crankshaft can rotate when the V-shaped reference device 10 and the measuring device 8 are brought onto the crankpin 15. It is thus possible to optimize the grinding cycle without the need to interrupt or slow down the machine cycle during the introduction phase.

The possibility of programming the motor 60 offers other advantages, such as the possibility of defining the rest position in an extremely simple and flexible way. It is also possible to define at least an intermediate position in which the backward movement of the support device 4 moving away from the checking condition can be stopped. This makes it possible to avoid running the entire path from the checking condition to the rest position, for example, when passing from one crankpin 15 to the next one to be checked during the checking of a crankshaft. The reduction of the path traveled allows an apparent advantage in terms of time. In this case, the intermediate position can be selected and simply programmed based on the minimum withdrawal stroke that is necessary to exit the maximum radial size of the crankshaft parts. In general, the possibility of programming the motor 60 in an apparatus according to the present invention allows to define in a simple and flexible way any start position of the apparatus, that is any position at which the reference device 10 is spaced apart from the pin 15 and is ready to displace towards a checking condition while the pin 15 is orbitally moving (e.g. according to the above-mentioned method) or while the pin 15 is stationary.

The driving of the programmable electric motor 60, or the input of the programming data, can take place, for example, through physical I/O devices or through serial communication. The programming data can be entered directly into the programmable electric motor 60 or, more frequently, through an electronic unit present in the control device 50. The I/O devices can be connected to the numerical control of the machine tool.

In a preferred embodiment, the apparatus according to the invention has integrated diagnostics functions. In particular, the control device 50 comprises in addition to the electronic unit, position sensors, encoders and/or other components whose signals are processed by the electronic unit to monitor system movement and safety parameters, and to know for example the position of the movable parts of the apparatus, or the displacement speed.

The rest position and any intermediate positions can be defined very simply in a calibration phase.

The invention claimed is:

1. An apparatus for checking diametral dimensions of a pin, in orbital motion about a geometrical axis, in a numerical control machine tool having a tool holding slide, with a reference device adapted to cooperate with the pin to be checked, a measuring device, movable with the reference device, a support device adapted to be fixed to the tool holding slide for movably supporting the reference device and the measuring device, to allow the reference device to move so as to follow the pin to be checked in its orbital motion, in a checking condition the correct cooperation between the pin to be checked and the reference device being maintained substantially due to the gravity, and a control device for controlling automatic displacements of the apparatus towards the checking condition and away from the checking condition, the control device comprising an electric motor and a transmission mechanism between the electric motor and the support device, wherein the electric motor is a programmable electric motor that is programmed so as to define a start position in which the automatic displacement of the apparatus away from the checking condition can be stopped.

2. The apparatus according to claim 1, wherein the programmable electric motor is programmed so as to define said start position as an intermediate position of the reference device, between a rest position and said checking condition of the apparatus, in which the automatic displacement of the apparatus towards or away from the rest position can be stopped.

3. The apparatus according to claim 2, wherein the programmable electric motor is programmed so as to define a displacement speed of said automatic displacements.

4. The apparatus according to claim 3, wherein the programmable electrical motor is programmed so as to define said displacement speed with which said automatic displacements of the apparatus towards the checking condition take place while the pin to be checked is orbitally moving, so allowing synchronization of said automatic displacements with orbital movements of the pin.

5. The apparatus according to claim 4, wherein the programmable electrical motor is programmed so as to define said displacement speed so that the contact between the reference device and the pin occurs when the pin is moving away from the reference device substantially with the maximum speed.

6. The apparatus according to claim 5, wherein the programmable electrical motor is programmed so as to define a start instant for said automatic displacements so that the contact between the reference device and the pin occurs when the pin is moving away from the reference device substantially with the maximum speed.

7. The apparatus according to claims 1, wherein said start position of the reference device is acquired in a calibration phase.

8. The apparatus according to claims 1, wherein said transmission mechanism includes comprises a driver coupled to a component of said support device, a worm coupled to the programmable electric motor and a helical gear wheel coupled to the worm coupled to the driver.

9. The apparatus according to claim 8, wherein the driver is adapted to rotate and is coupled to a component of the support device by means of a coupling with backlash between a shaft having a substantially flat section and a butterfly-shaped seat of the driver.

10. The apparatus according to claim 9, wherein the driver includes comprises a bolt adapted to protrude inside the butterfly-shaped seat during the rotation of the driver to constrain the relative rotations between the shaft and the driver and lock the position of the support device.

11. The apparatus according to claims 1, including comprising a guiding mechanism associated with the support device for guiding the arrangement of the reference device onto the pin, towards a checking condition of the apparatus.

12. The apparatus according to claims 1, wherein the reference device is a V-shaped device having bearing and reference surfaces adapted to engage the surface of the pin.

13. The apparatus according to claims 1, wherein the tool holding slide carries a grinding wheel, and the control device comprises a mechanism for compensating the wear of the grinding wheel.

14. The apparatus according to claim 1, wherein the programmable electric motor is programmed so as to define a displacement speed of said automatic displacements.

15. The apparatus according to claim 14, wherein the programmable electrical motor is programmed so as to define said displacement speed with which said automatic displacements of the apparatus towards the checking condition take place while the pin to be checked is orbitally moving, so allowing synchronization of said automatic displacements with orbital movements of the pin.

16. The apparatus according to claim 15, wherein the programmable electrical motor is programmed so as to define said displacement speed so that the contact between the reference device and the pin occurs when the pin is moving away from the reference device substantially with the maximum speed.

17. The apparatus according to claim 16, wherein the programmable electrical motor is programmed so as to define a start instant for said automatic displacements so that the contact between the reference device and the pin occurs when the pin is moving away from the reference device substantially with the maximum speed.

18. A method for checking diametral dimensions of a pin, in orbital motion about a geometrical axis at a known rotational speed, on a numerical control machine tool having a tool holding slide, with an apparatus comprising
a reference device adapted to cooperate with the pin to be checked,
a measuring device, movable with the reference device,
a support device adapted to be fixed to the tool holding slide and movably supporting the reference device and the measuring device, to allow the reference device to move so as to follow the pin to be checked in its orbital motion, and
a control device with a programmable electric motor for controlling displacements of the apparatus toward and away from a checking condition, at the checking condition the reference device rests on the pin to be checked, the method comprising the following steps, not necessarily in this order:
define a start position of the apparatus at which the reference device is spaced apart from the pin,
define a match position of the pin, the reference device being able to engage the pin at said match position,
calculate, based on the known rotational speed, a travel time that the pin needs, in its orbital motion, to cover a path between a predetermined angular position and said match position,
define a displacement speed of the apparatus and calculate an approaching time needed to displace the apparatus from the start position to the match position of the pin,
calculate a delay based on said travel time and approaching time,
detect a transit instant at which the pin, during its orbital motion, is located at said predetermined angular position,
calculate a start instant based on said transit instant and said delay, and
at the start instant control a displacement of the apparatus from the start position to the checking condition.

19. The method according to claim 18, wherein said match position is chosen as a central position of the pin, aligned with said geometric axis while the pin is orbitally moving towards a bottom dead center of its path.

* * * * *